Figure 2:
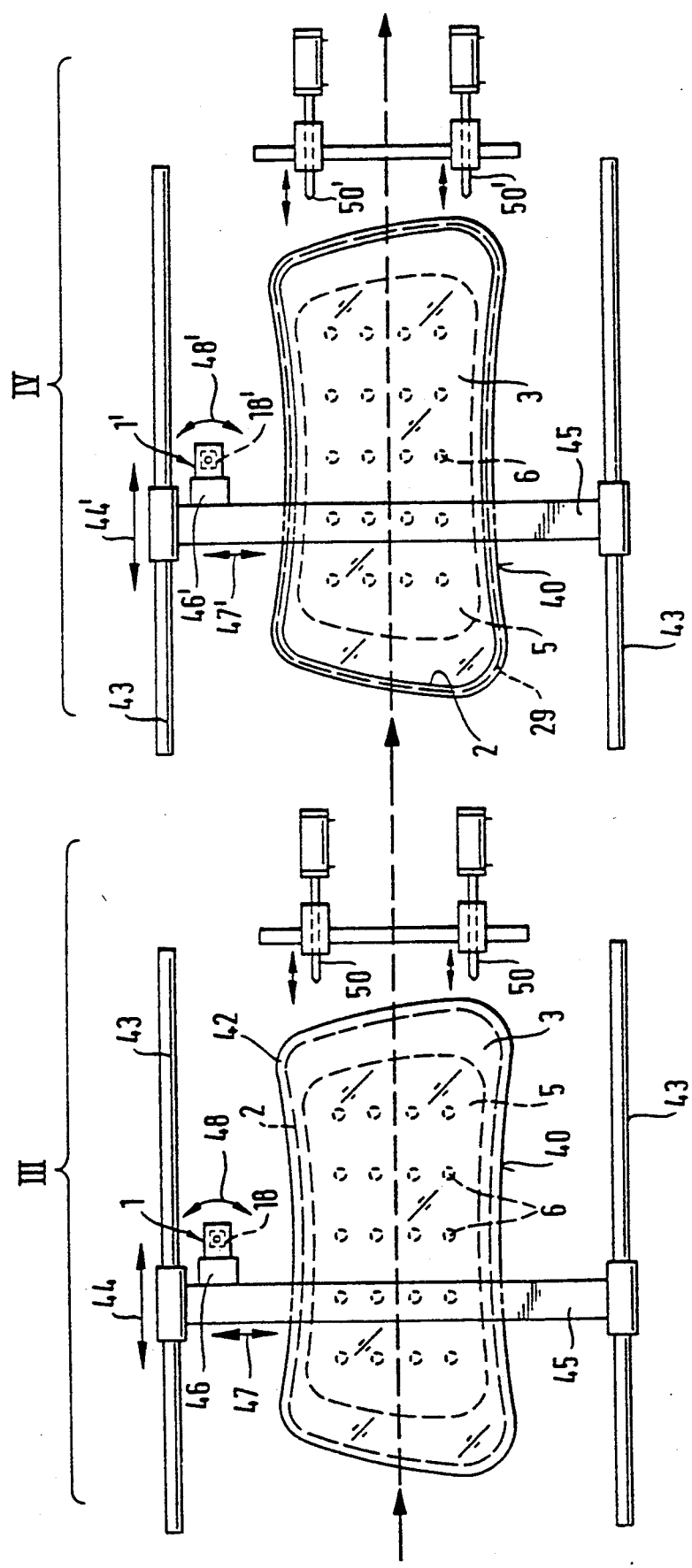

United States Patent [19]

Lisec

[11] Patent Number: 5,173,148
[45] Date of Patent: Dec. 22, 1992

[54] INSTALLATION FOR THE PRODUCTION OF INSULATING GLASS

[76] Inventor: Peter Lisec, A-3363, Amstetten-Hausmening, Austria

[21] Appl. No.: 640,115

[22] Filed: Jan. 11, 1991

[30] Foreign Application Priority Data

Jan. 11, 1990 [AT] Austria .................................... 53/90

[51] Int. Cl.$^5$ .............................................. B05C 13/02
[52] U.S. Cl. ...................................... 156/578; 156/356; 269/21; 269/305; 198/471.1; 198/803.5
[58] Field of Search ................. 156/99, 102, 107, 109, 156/292, 356, 578; 118/697, 300; 269/21, 305; 425/66, 375; 222/47, 48, 526, 522, 566; 198/471.1, 803.5

[56] References Cited

U.S. PATENT DOCUMENTS

| | | | |
|---|---|---|---|
| 2,920,989 | 1/1960 | Cochran et al. | 156/556 |
| 3,233,887 | 2/1966 | Dunham | 269/21 |
| 3,307,818 | 3/1967 | Cocito | 269/21 X |
| 3,391,805 | 7/1968 | Baden | 414/791.3 |
| 3,759,771 | 9/1973 | Battersby | 156/244.11 |
| 3,852,149 | 12/1974 | Sitter et al. | 156/109 |
| 3,876,489 | 4/1975 | Chevel | 156/109 |
| 3,886,013 | 5/1975 | Bowser et al. | 156/109 |
| 4,088,522 | 5/1978 | Mercier et al. | 156/292 |
| 4,367,107 | 1/1983 | Valiment et al. | 156/99 |
| 4,458,628 | 7/1984 | Fujii et al. | 118/697 |
| 4,564,410 | 1/1986 | Clitheros et al. | 156/578 |
| 4,581,276 | 4/1986 | Kunert et al. | 428/157 |
| 4,696,713 | 9/1987 | Okafuji et al. | 156/99 |
| 4,793,878 | 12/1988 | Giorgio et al. | 156/102 |
| 4,956,034 | 9/1990 | Shinozaki et al. | 156/102 |

FOREIGN PATENT DOCUMENTS 0111206 6/1984 European Pat. Off. .
2016960 9/1979 United Kingdom .
9002696 3/1990 World Int. Prop. O. .

Primary Examiner—Michael W. Ball
Assistant Examiner—Francis J. Lorin
Attorney, Agent, or Firm—Young & Thompson

[57] ABSTRACT

A facility for the production of curved or arcuate insulating glass panes for vehicle windows comprises a station for the application of a spacer and a station for the application of a rope of sealing compound onto a glass pane. Furthermore, stations are provided for the assembly of the insulating glass pane and for pressing the insulating glass pane. The glass panes (3) are transported on supports (5) in exact alignment to the individual stations and are retained in the stations by the supports (5) by virtue of a vacuum. For this purpose, the supports (5) are equipped with a vacuum storage (75) connected via conduits (7) to bores (6) in the supports (5).

40 Claims, 8 Drawing Sheets

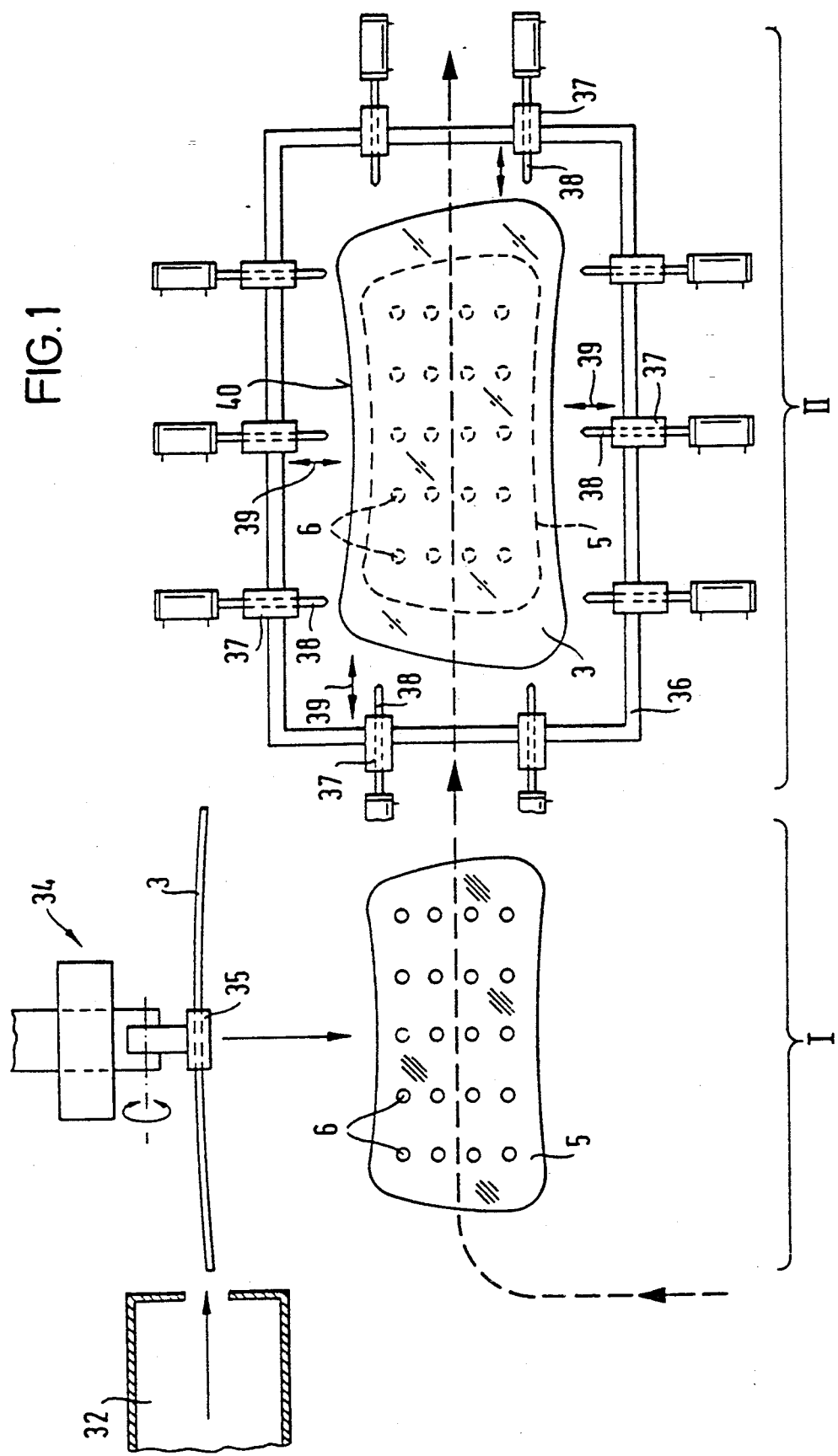

INSTALLATION FOR THE PRODUCTION OF INSULATING GLASS

The invention relates to a facility for the production of insulating glass panes from at least two glass panes curved toward at least one direction, especially insulating glass for motor vehicle windows.

Facilities for the production of insulating glass are known in various designs. As one example of such a facility, attention is invited to EP-A-252,066 with additional literature citations.

Facilities for the manufacture of insulating glass customarily include a device for cleaning the glass plates, a device wherein spacer frames of metal profile members or of a synthetic resin (swiggle strip) are placed manually or automatically onto one glass pane, a station for the assembly of the insulating glass panes wherein one glass pane is placed on the spacer attached to the first glass pane, a press ordinarily fashioned as a plate press, and, finally, a station wherein the outwardly open edge groove between the two glass panes, delimited toward the inside by the spacer, is filled with a caulking compound (sealing compound). The glass panes are transported in the conventional facilities normally substantially in a vertically upright position by means of conveying devices. These conveying devices are usually roller or belt conveyors, and the glass panes lean against lateral supports designed as roller or air cushion walls.

It is also known from EP-A-176,388 to extrude onto the rim of a glass pane a synthetic resin rope which is to serve as a spacer for the insulating glass.

All of the conventional devices are designed for the processing of planar glass panes of differing sizes and varying cuts and are unsuitable for the manufacture of insulating glass panes of curved glass plates, especially due to the lack of suitable conveying systems.

Insulating glass panes, consisting of two mutually parallel, curved or arcuate glass panes, is made available to an increasing extent for use in automotive vehicle windows as the windshield, the rear window and side windows, since its good thermally insulating and sound-insulating properties are of interest also in the automobile manufacturing field.

The use of customary prefabricated or metallic spacer frames is impossible on account of the small thicknesses of the pane set provided for automobile windows.

Another problem in the processing of glass panes curved toward at least one direction resides in that the marginal zone of such glass panes is more or less wavy, i.e. deviates toward the top or toward the bottom from its required position. Moreover, differing height positions of their rims result due to the various cut-to-size configurations for such curved or arcuate panes which, in most cases, are bent only after they have been cut to size. The above-mentioned waviness of the rim of such glass panes also is a consequence of the thermal hardening step to which the glass panes are subjected which are intended for automotive vehicle windows.

A further problem in the handling of glass panes curved toward at least one direction resides in that these panes, in the conventional devices, can be transported and, in particular, positioned in exact alignment only under difficulties; this is of decisive importance for the further processing steps. The vacuum suction means with resilient sealing lips, usually employed for fixing glass panes in position, are suitable only conditionally for the exact positioning of curved or arcuate glass panes since the sealing lips will yield during the suctioning step and thus the glass pane proper will likewise be shifted.

The invention is based on the object of providing a facility for the production of curved or arcuate insulating glass panes which is suitable especially for the windows of vehicles, such as automobiles or rail vehicles.

According to the invention, a facility of the type discussed hereinabove is characterized by a station for the application of a synthetic resin rope serving as the spacer, a station for the application of a caulking compound in parallel to the spacer, this station being optionally combined with the previously recited station, a station for assembly, a station for pressing the composed pane set, and by a conveying device for conveying the glass panes through the stations of the facility, this conveying device exhibiting, in particular, supports for the glas pane which are movable on rails, these supports being curved, on their supporting surface facing the glass pane, approximately in correspondence with the shape of the glass pane and being equipped with means for fixing the glass pane in position.

One of the special features of the facility according to this invention resides in that the sealing compound is applied simultaneously with or directly after the application of the spacer onto the glass pane beside and outside of the rope serving as the spacer, i.e. even before the insulating glass pane is assembled. This measure avoids difficulties that could result if a caulking compound (sealing compound) is to be introduced into the narrow edge groove between the glass panes with adequate precision and with sufficiently complete filling of the edge groove. In this connection, it is to be kept in mind that a mechanical scanning of the depth of the edge groove is impossible in case the spacer does not consist of a metal.

Another advantageous feature of the facility according to this invention resides in the supports provided for transporting the glass panes or the pane sets in the facility of this invention. Due to the fact that the supports have a configuration approximately adapted to the curvature or arch of the glass panes—preferably, they show a somewhat lesser curvature or arch than the glass pane—a secure seating for the glass pane or the pane set on the supports is achieved without incurring the disadvantages of the resilient sealing lips of the conventional suction cups.

In order to keep the rim of the glass panes, fixed in position on the supports, accessible for processing, it is preferred to make the supports smaller than the glass panes held thereby so that the glass panes project past the rim of the support.

The fixed positioning of the glass panes on the supports is preferably accomplished by means of vacuum devices with which the supports are equipped.

In a preferred embodiment of the invention, the provision is made that, upstream of the station for applying the spacer, a station is arranged wherein glass panes coming from a washing machine are placed on a support of the conveying device and fixed in position in exact alignment. In this arrangement, according to a variation of the invention, the provision can be made that the glass panes are seized by a robot equipped with a suction gripper upon exiting from the washing machine and placed onto the support. In place of a robot equipped with suction means which seizes the glass panes at the outlet of the washing machine and places them on the support, it is also possible to provide a unit comprising gripper members which are of a hook shape, for example, and which can be brought into contact with at least two mutually opposed rims of the glass pane. In this way, impressions of suction cups on the surfaces of the glass panes that subsequently are located in the interior of the insulating glass panes are avoided.

The alignment of the glass panes on the supports becomes particularly simple and accurate in case the station is equipped with at least three, preferably more than three positioning slides which latter align the glass pane with respect to the support before the pane is fixedly positioned on the support.

For the exact alignment of the glass pane in the further stations, especially also in the station for the application of the spacer means, at least two stops are provided according to this invention for the exactly aligned stoppage of the glass pane in the respective station. These stops can engage at the rim of the glass pane or at counter stops at the support.

In a simple embodiment of the facility according to this invention, the provision is made that the nozzle for the application of the spacer means is retained on a carriage adjustable along a bridge which latter is movable transversely to its longitudinal extension. These carriages, movably mounted on displaceable bridges, are known, in principle, from glass cutting machines.

An especially simple adaptation to arbitrary pane formats and cutting sizes results in case the provision is made that the extrusion nozzle is movable toward several degrees of freedom wherein the degrees of freedom constitute the displaceability of the bridge, the adjustability of the carriage along the bridge, the rotation of the nozzle about an axis perpendicular to the surface of the glass, the adjustability of the mounting of the nozzle perpendicularly to the axis (coarse adjustment), and the adjustability of the nozzle with respect to its mounting (fine adjustment).

It is infeasible to allow the nozzle to slide directly on the rim of the glass pane for the application of the spacer means since the sliding of the nozzle on the glass pane would damage the glass pane as well as the nozzle proper, and increased friction would occur. In this connection, it is to be pointed out that damage to the glass panes, which latter are tempered as is customary for automotive vehicle window panes, can lead to premature breakage of these panes.

The invention furthermore concerns an embodiment by means of which synthetic resin can be applied, for the formation of a uniformly thick and uniformly wide rope, serving as a spacer and/or as a caulking compound, onto glass panes which are curved at least toward one direction.

EP-A-176,388 discloses a device for the application of a synthetic resin rope to a glass pane. The conventional device does not possess a unit functionally associated with the nozzle and serving for controlling the nozzle so that it follows any possible unevennesses of the glass plate. Rather, the drive mechanism for bringing the nozzle in association with the glass plate is not designed so that it moves the nozzle, during application of the plastic composition, perpendicularly to the glass plate. Rather, measures are merely taken for advancing the nozzle to a greater or lesser extent in correspondence with the thickness of the glass plate.

It is known from DAS 2,601,030 to equip a nozzle for the application of ropes of caulking compound with a platelet which slides on the workpiece to which the rope is to be applied. This is to attain the objective of overcoming "any possible, small obstacles constituted by irregularities of the plate without the nozzle coming into contact with the plate". The conventional construction is based on a rigid connection between the "platelet" and the nozzle.

This embodiment is distinguished in that, as seen in the direction of movement in front of the nozzle, a device is provided for measuring the distance between the mounting of the nozzle and the surface of the glass pane, for example a probing finger in contact with the surface of the glass pane, controlling the drive mechanism for adjusting the nozzle perpendicularly to the surface of the glass pane in such a way that the nozzle is in each case located at a predetermined distance above the surface to which the compound is to be applied.

In this embodiment of the invention, the provision is made that the spacing between the glass pane and the mounting for the nozzle is measured—for example by the probing finger—and the nozzle is adjusted with respect to its mounting by means of a drive mechanism in correspondence with the result of this measurement. In this arrangement, the mounting—in the normal case—is not adjusted perpendicularly to the glass pane. By virtue of this embodiment of the device according to this invention, the spacing of the nozzle from the plate-shaped article remains constant without the exertion of appreciable forces on the topside of the plate-shaped article—differently from the arrangement in DAS 2,601,030 where the entire force for movement of the nozzle must be provided by the "platelet".

It is possible by means of the device according to this invention to guide the nozzle in extremely close proximity (e.g. 0.5 mm) to the rim of the glass pane without the nozzle coming into contact with the glass pane where the latter is curved upwardly in its marginal zone, i.e. deviates in the upward direction from its ideal position. On the other hand, the nozzle in the device of this invention follows the marginal zone even if the latter is curved downwardly, i.e. deviates in the downward direction from its ideal position. It is understood that it is possible, by means of the device according to the invention, to take into account without difficulties even those changes in the position of the rim of the plate-shaped article in the direction of the adjustability of the nozzle (the spacing of the nozzle from the surface remaining constant) which are the result of the curvature or arcuation of plate-shaped articles (glass panes) in conjunction with an irregular contour.

The control of the movement of the nozzle perpendicularly to the glass plate according to this invention also makes it possible to regulate the amount of plastic composition by way of signals transmitted by the "probing finger", for example, in such a way that a greater amount of plastic composition is applied in zones of concavely curved segments, and less composition in regions of convexly curved segments. In this way, a substantially linear or planar topside of the rope of plastic composition can be obtained.

It is possible with the use of the device according to this invention to apply a rope serving as the spacer to glass panes which are further processed into insulating glass panes for automotive vehicle windows. Ordinarily, the rope applied as a spacer means consists in this case of butyl rubber into which a hygroscopic material has been incorporated.

However, it is likewise possible by means of the device according to the invention to also apply, in an additional operating step or, when using a twin nozzle, in the same operating step, besides the rope of butyl rubber or the like serving as a spacer, a rope serving as a sealing medium, preferably of an elastically curing bicomponent synthetic resin (e.g. a polysulfide). In this case, it is expedient to fashion the rope serving as the spacer to be somewhat thicker than the rope serving as the sealing compound; this is readily possible by an appropriate setting of the nozzle control (spacing from the surface of the glass pane) based on the signal transmitted by the measuring unit, for example the probing finger. However, it is likewise feasible to apply a rope of a pasty composition fulfilling the functions of the spacer as well as the sealing compound.

The measuring unit, for example the probing finger, transmits its signals to the control means of the drive mechanism for the adjustment and/or readjustment of the nozzle in a direction perpendicularly to the surface of the curved or arcuate glass pane and for this purpose, for example, with an electronic measuring ruler or a similar device, transmitting signals corresponding to its position relatively to its mounting.

Due to the fact that the spacing of the nozzle from the surface to which the rope of plastic composition is applied is maintained exactly constant in the device of this invention, it is likewise readily possible to maintain the desired and predetermined width of the synthetic resin rope. To this end, preferably the velocity of the movement of the nozzle along the rim of the glass pane is controlled in dependence on the quantity; for this purpose, a sensor is preferably arranged in the region of the outlet orifice of the nozzle which the amount of plastic composition actually exiting from the nozzle (exit rate) and transmits corresponding signals to the nozzle control which latter regulates the speed of the movement of the nozzle relatively to the glass pane in dependence on the exit rate in such a way that even in case of changes in the flow rate of plastic composition through the nozzle orifice per unit length of the rim of the plate-shaped article, e.g. the glass pane, exactly the desired quantity of plastic composition is applied.

By means of these measures ensuring the exact maintenance of the applied quantity of plastic composition in the ropes serving as the spacer and/or as sealing compound, an edge of especially the composition applied as a spacer is obtained, even after pressing the pane set from the two glass panes curved toward at least one direction, which is not wavy toward the inside of the pane but rather is smooth and extends in parallel to the contour shape of the plate-like article, exhibiting a uniform spacing from the rim of this article.

In a preferred embodiment of the invention, the provision is made that the nozzle is fashioned for the application of a rope rectangular in cross section to the rim of the glass pane. Advantageously, the feature is provided that the upper boundary surface of the rope is curved about an axis in parallel to the longitudinal direction of the rope. In this way, during assembly and pressing of the insulating glass pane, disadvantageous air inclusions that could occur in case of planar boundary surfaces are reliably avoided.

A device according to this invention which has a simple structure is characterized in that the probing finger carries a roller at its end in contact with the surface of the glass pane.

Under practical conditions, an embodiment of the device according to this invention has proven itself well wherein, for adjusting the nozzle perpendicularly to the surface of the glass pane, two mutually independent drive mechanisms are provided, a first drive mechanism being a conventional drive means for adjusting the nozzle for movement in front of the surface of the glass pane, and the second drive means being connected with the measuring device, for example the probing finger, in an operative fashion.

In this embodiment, the provision is advantageously made that the measuring device, for example the probing finger, is carried by the nozzle holder which latter is adjustable by the first drive means, and that its signals, corresponding to the distance between the holder and the surface of the glass pane, or, respectively, to changes in this distance, are transmitted to the second drive means for the adjustment of the nozzle.

In another embodiment of the device of this invention, the provision is made that the station for the application of a caulking compound contains a nozzle for the application of caulking compound, this nozzle being movable in parallel to the spacer and—based on the glass pane—outside of the spacer, and that the nozzle for applying the caulking compound is retained on a carriage which latter is adjustable along a bridge that can be moved transversely to its longitudinal extension.

The nozzle for the application of the caulking compound can be designed, as indicated in dependent claims 15-19; with the advantageous features indicated above in connection with the nozzle for the application of the spacer means.

An embodiment of the facility according to this invention is likewise possible wherein the nozzle for applying the spacer and the nozzle for applying the caulking compound are arranged in a single unit. In this case, two separate carriages can be mounted to be adjustable, for example, on two carriages at a beam which itself is movable; or, as provided in one embodiment of the invention, the nozzle for applying the caulking compound to the glass pane is combined into a twin nozzle with the nozzle for applying the spacer.

In all of the aforementioned versions, one embodiment is preferred according to which the nozzles for applying the spacer and/or the nozzle for applying the rope of caulking compound are fashioned for the production of ropes having a rectangular cross-sectional shape where the rope constituting the spacer is thicker than the rope of caulking compound.

According to a further development of the invention, the provision is made that a gripper is arranged in the station for the assembly of two glass panes, i.e. for placing a glass pane onto the glass pane retained on the support and provided with the two synthetic resin ropes, this gripper picking the glass pane to be placed on the other pane up, for example from a stack of glass panes, and depositing same on the synthetic resin ropes; and that, after release of the gripper, alignment slides are arranged which can be advanced from the outside toward the rim of the glass pane retained in the support. By means of these alignment slides, the glass pane placed on top of the other pane can be moved into a position exactly congruent with the retained glass pane.

This embodiment can be furthermore distinguished in that the alignment slides can be advanced preferably simultaneously up to contact with the glass pane retained on the support and/or that the alignment slides are controlled with evaluation of the data for the contour shape of the glass pane stored in the glass cutting unit with which the glass pane has been produced.

According to another embodiment of the invention, the provision is made that a tool is located, in the station for pressing the pack of superimposed glass panes, which can be moved along the rim of the glass panes and is equipped with at least two mutually opposite pressure rollers; the latter can be urged toward each other and can be brought into contact with the pane pack from both sides. This embodiment has the quite especially advantageous feature that the support in all directions is smaller than the glass pane fixed thereon so that the pressure rollers can be placed from both sides against the pane pack. In order to be able to guide the press unit along the rim of the pane set, the provision can be made that the tool is mounted to a carriage guided to be adjustable on a bridge movable transversely to its longitudinal extension, and that the pressure rollers are turnable at the carriage about an axis approximately perpendicular to the surface of the glass panes.

All of the motion processes of processing tools (nozzles for the application of the spacer, nozzles for applying the sealing compound, and the tool with the two rollers for pressing the assembled glass panes, as well as the control of the movements of the positioning slides and the alignment slides, can be regulated with evaluation of the data for the contour shape of the glass panes stored in the glass cutting unit used to produce the glass panes composed into the curved or arcuate insulating glass pane.

Figure 3:
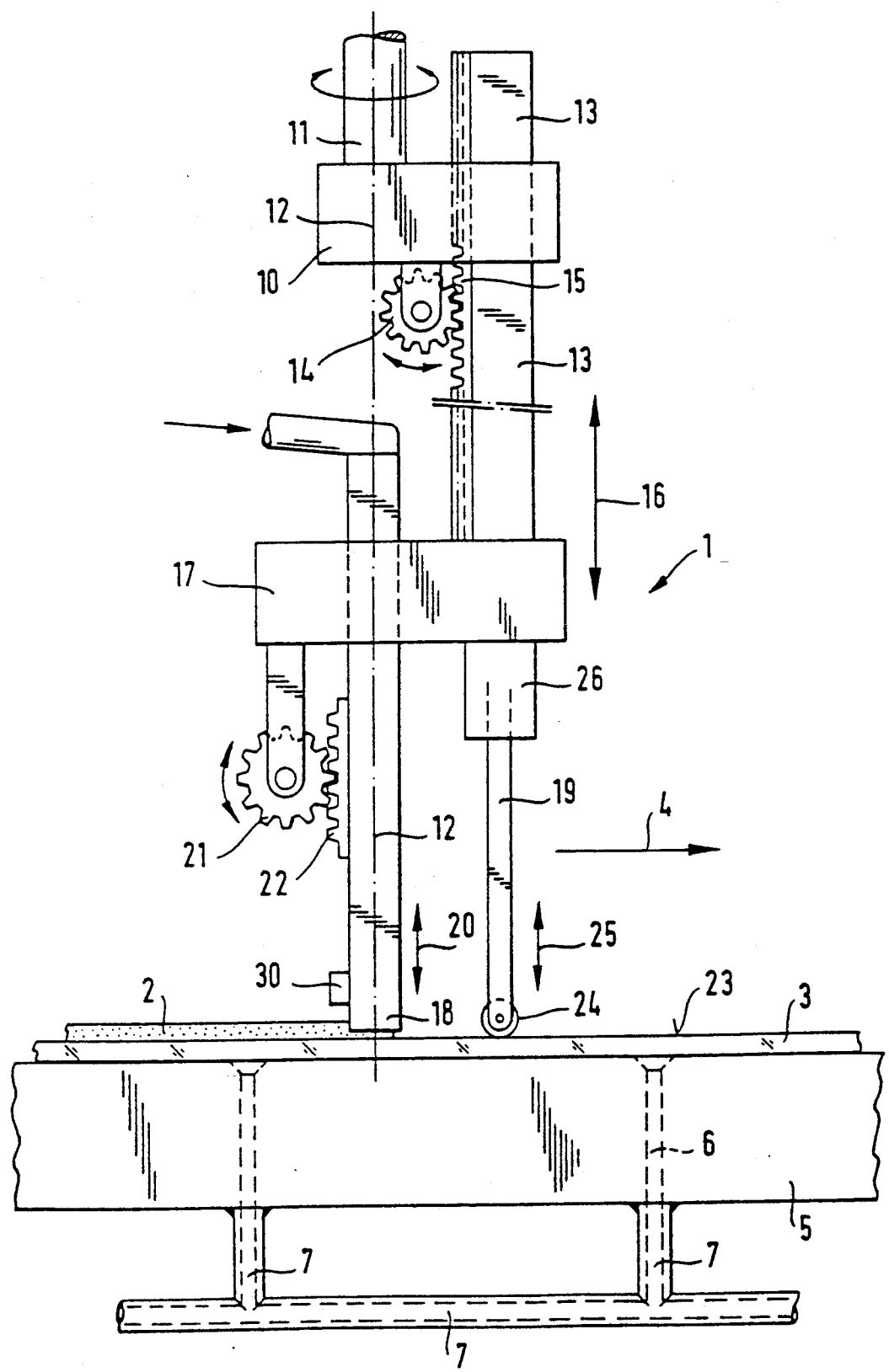
Figure 1:
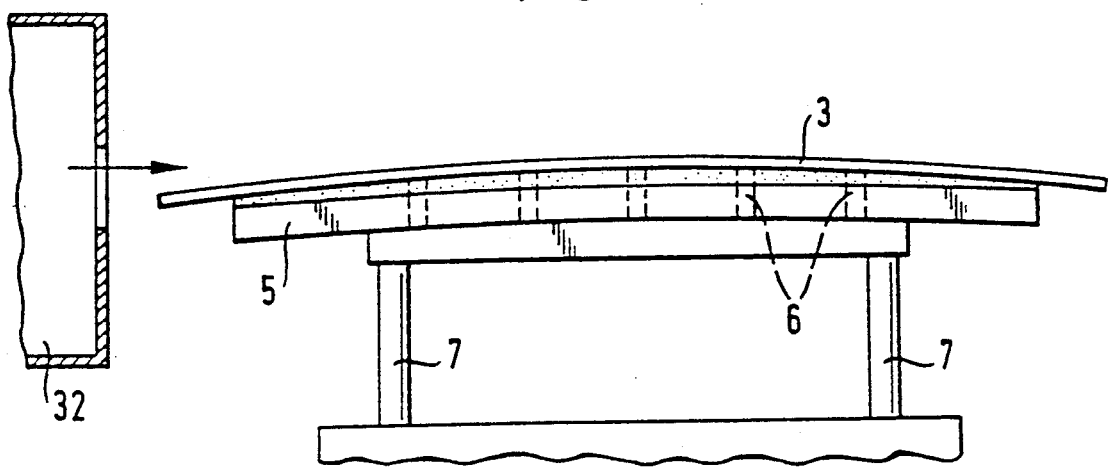
Figure 3:
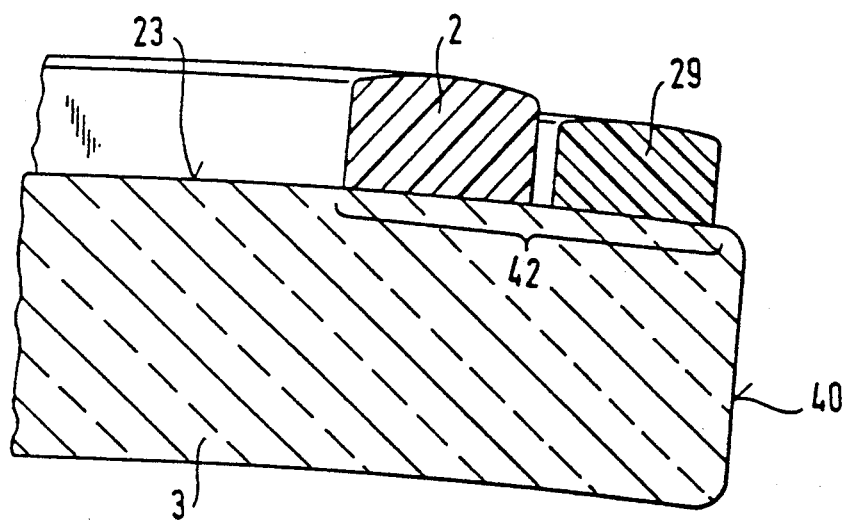
Figure 4:
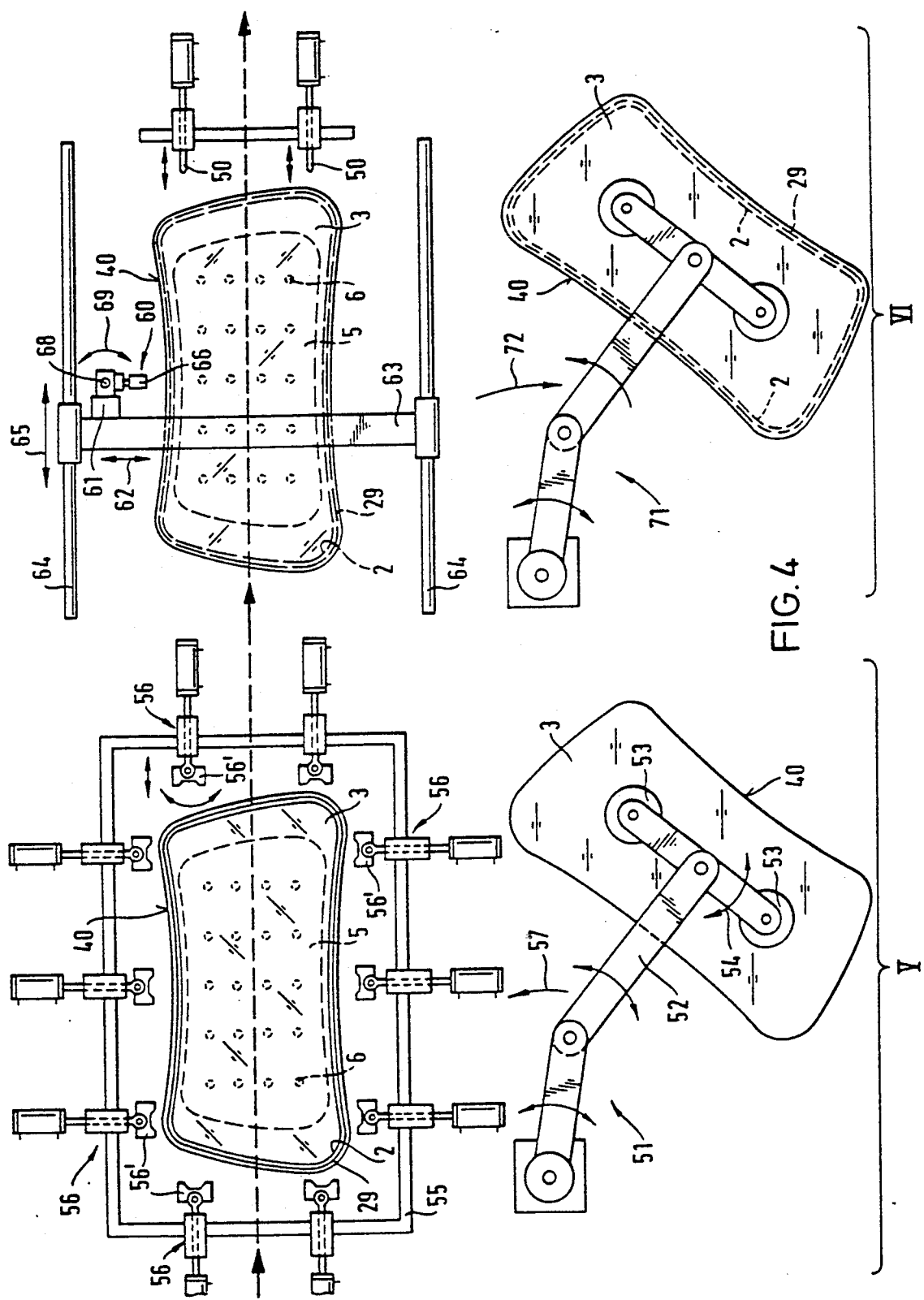
Figure 5:
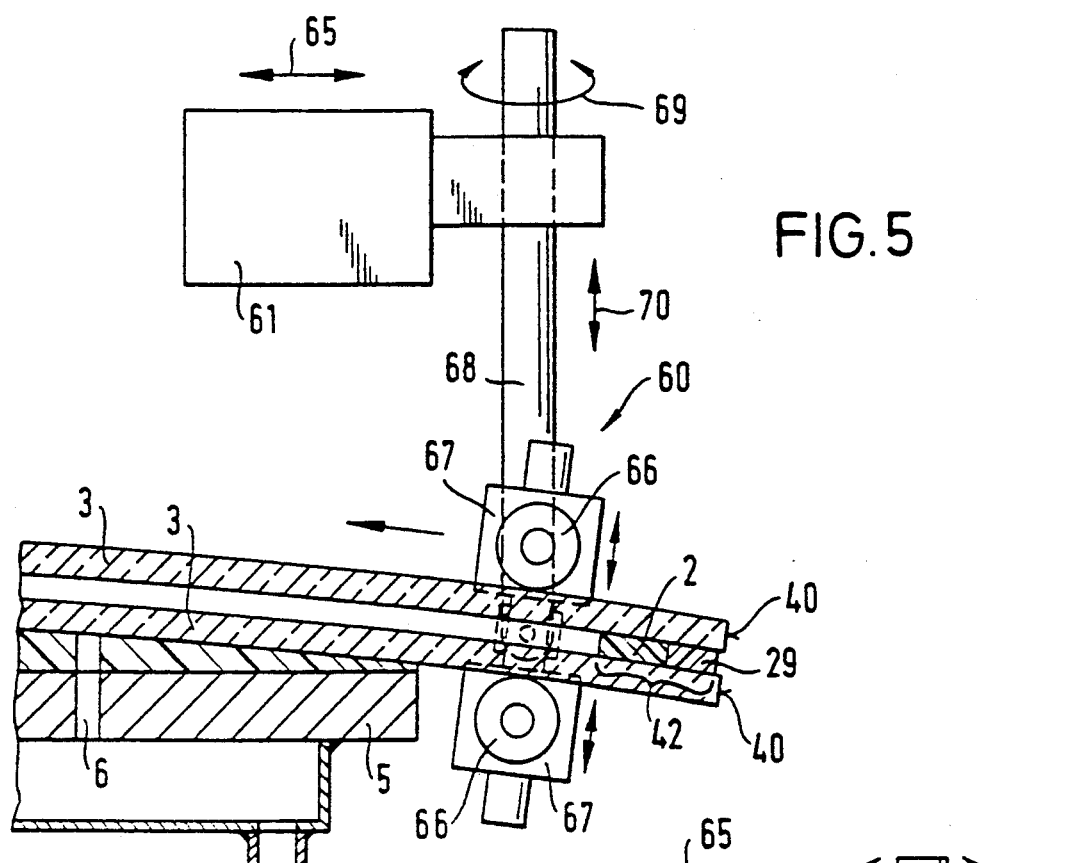
Figure 6:
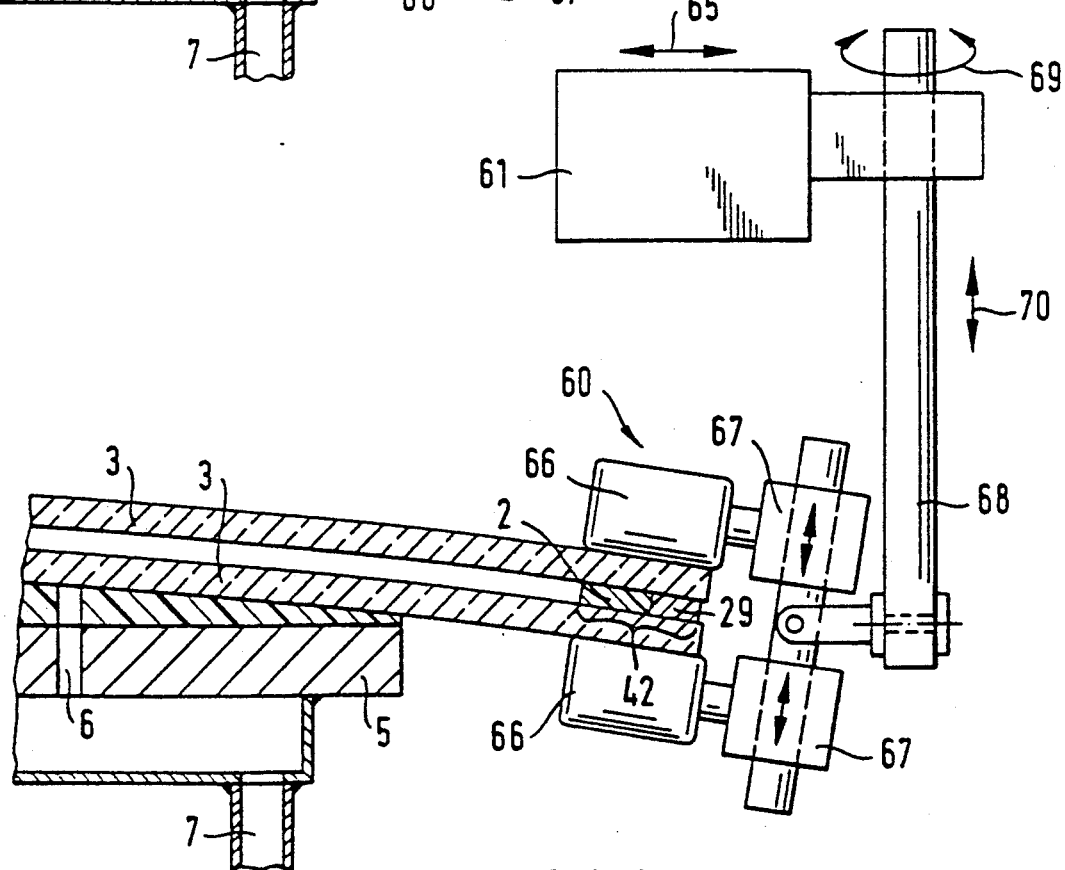
Figure 7:
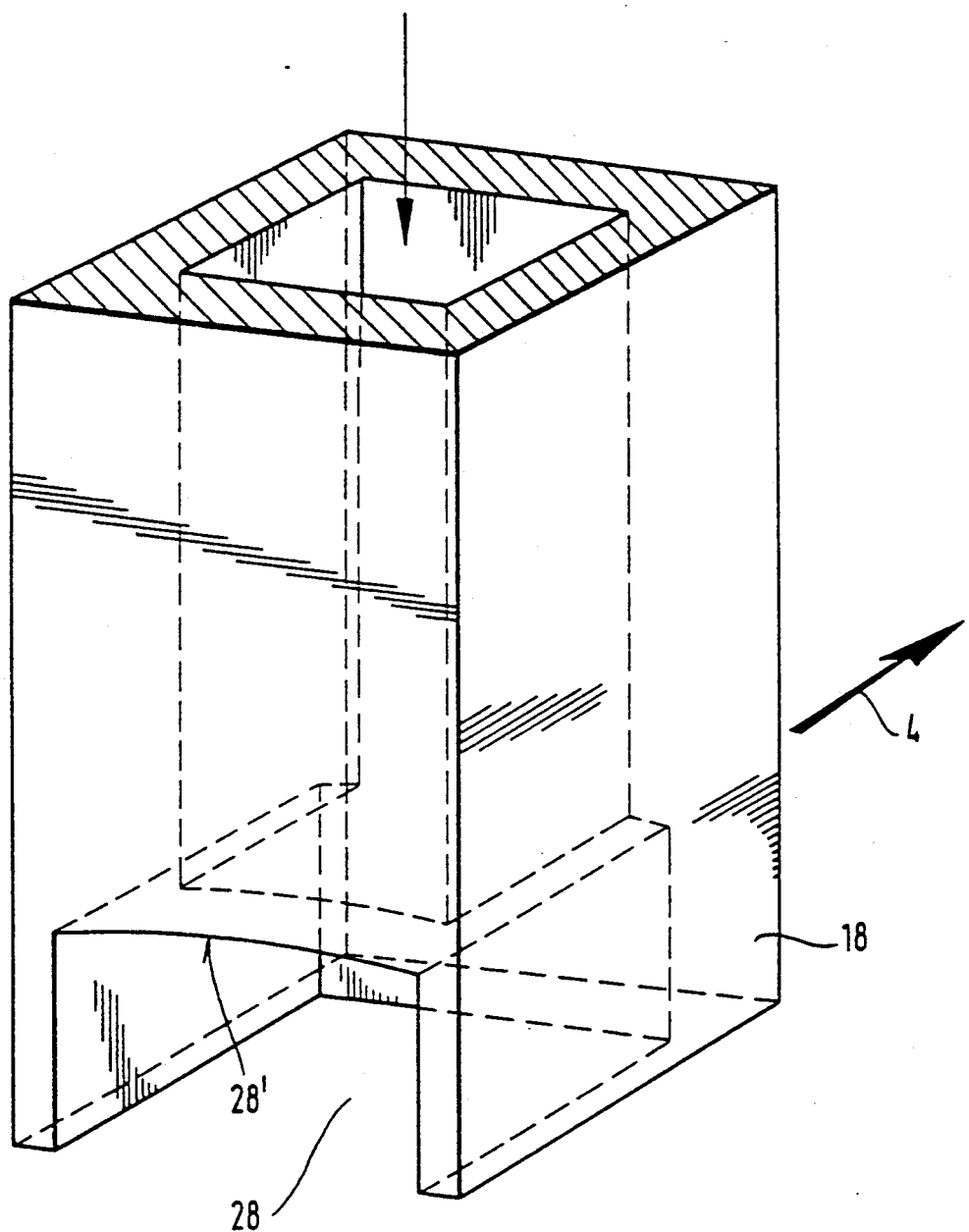
Figure 8:
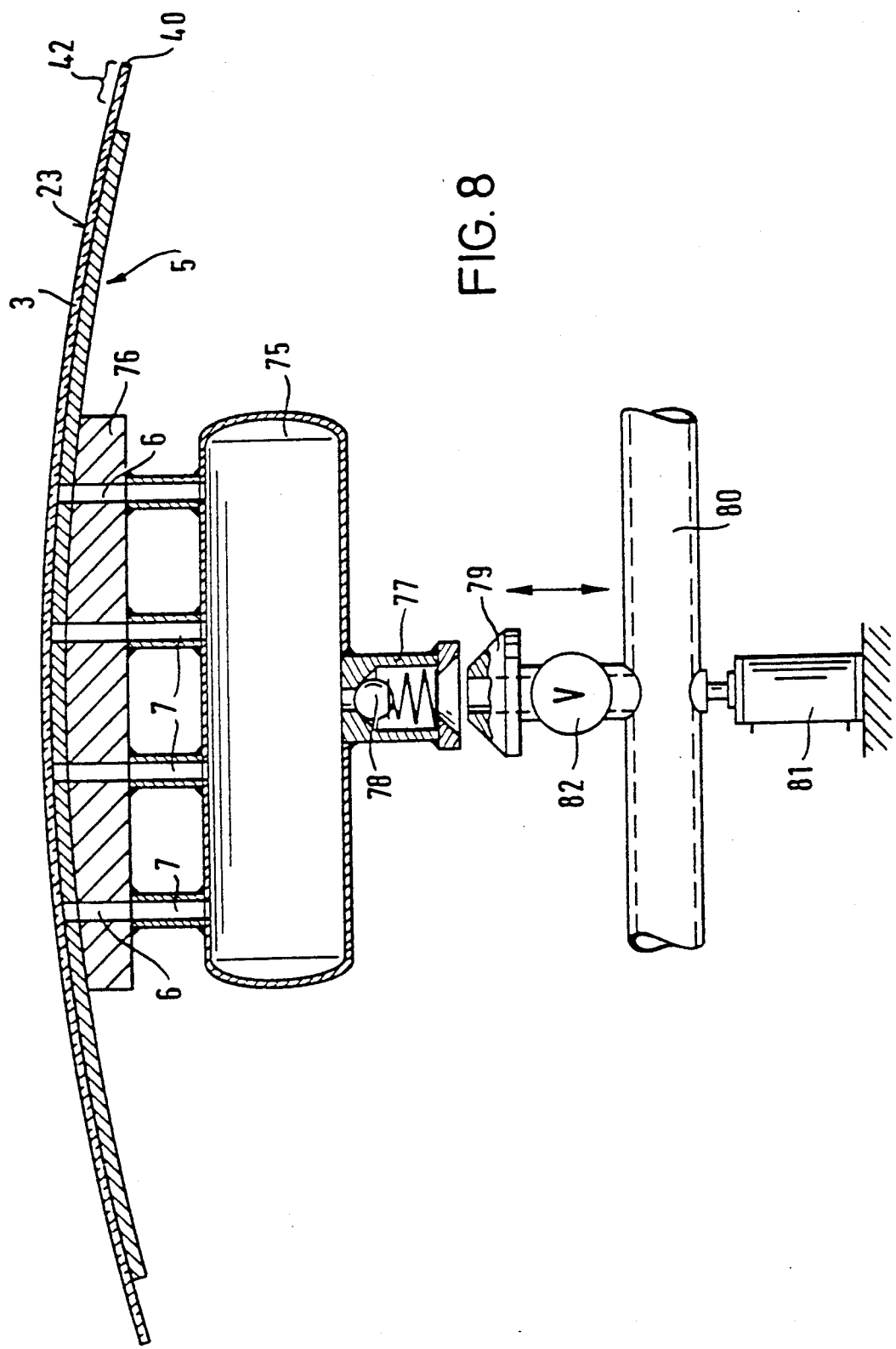

Additional details and features of the invention can be seen from the following description of the embodiments of a facility according to this invention schematically illustrated in the drawings wherein:

FIG. 1 shows in a schematic view and in a top view a station I for placing curved glass panes on a support and a station II for aligning the glass panes on the support, FIG. 1' shows another embodiment of station I, FIG. 2 shows a station III for applying a synthetic resin rope serving as the spacer and a station IV for applying a rope of caulking compound, FIG. 3 shows an embodiment of a nozzle usable in stations III and IV, FIG. 3' shows a glass pane (in part) with two applied ropes (spacer and caulking compound), FIG. 4 shows a station V for assembly of insulating glass panes and a station VI for pressing the assembled insulating glass pane sets, FIG. 5 shows the press tool in an elevational view, FIG. 6 shows the press tool in a second elevational view, FIG. 7 shows a nozzle, and FIG. 8 shows a support with a vacuum tank.

In station I for the placement of curved glass panes 3 coming from a washing machine 32, the glass panes 3 are laid against supports 5.

The washing machine 32, including the conveyor provided therein, can have the structure known, for example, from EP-A-174,294.

FIGS. 1 and 1' show two alternatives for station I; the alternative illustrated in FIG. 1' shows that the glass panes 3 are laid, coming from the glass washing machine 32, immediately against a support 5 whereupon the support 5 is then swung from its essentially vertical position into the position wherein its supporting surface is oriented approximately horizontally, and the glass pane 3 is supported from below.

In the other alternative shown in FIG. 1, a device 34 is provided equipped with two clamps or hook-like members 35 which seize the glass pane 3 at its upper and lower rims and, with pivoting by 90° about a substantially horizontal axis, place it on a ready support 5.

The supports 5 which, in the facility of this invention, are utilized for transporting the glass panes 3 to the various processing stations and maintaining them in exact alignment therein have a convexly curved supporting surface corresponding approximately to the contour of the glass pane 3 to be processed and being smaller than the glass pane 3 so that the glass pane 3 projects on all sides past the supporting surface of the support 5 (form-fitting cradle). Advantageously, the supporting surface of the supports 5 is made of a synthetic resin shaped, for example, by bringing it in the heated, deformable condition into contact with a template disk and bending it correspondingly.

Bores 6 can be provided in the support 5 for emplacement of the glass pane 3, these bores being connected via conduits 7 to a vacuum source so that a glass pane 3 can be retained on the support 5 by means of vacuum.

The support 5 is transported to and through the individual stations of the facility of this invention with the aid of a rail system, symbolized by a dashed line, or by means of some other conveying system, and is returned from the final station of the facility again to station I.

The station II shown in FIG. 1 serves for the exact alignment of the glass pane 3 placed on a support 5 with respect to the latter so that the glass pane 3 can be accurately positioned in the subsequent stations. For this purpose, the vacuum is shut off via conduit 7 in station II after the support 5 with a glass pane 3 placed thereon has been transported into a position which is defined, for example, by at least one stop, and positioning slides 38 extensible and retractable in the direction of double arrow 39 and being mounted in a frame 36 in guides 37 are advanced to such an extent that they come into contact with the outer edge 40 of the glass pane 3 and align same in a predetermined way with respect to the support 5. The movement of the positioning slides 38 which can be brought about by any desired linear motors, such as pressure medium cylinders, especially hydraulic cylinders, stepping motors, and the like, associated preferably with electronic measuring rulers for detecting the movements of the positioning slides, is controlled with evaluation of the data stored in the CNC regulation of the glass cutting machine wherein the glass pane 3 has been cut to size. These data correspond to the contour shape of the glass pane 3, i.e. the route of its edge 40 so that the glass pane 3 can be exactly positioned on the support 5 by controlled movement of the positioning slides 38 with evaluation of these data. After the glass pane 3 has been aligned on the support 5, it is again fixedly retained thereon.

From station II, the supports 5 are then moved, with glass panes 3 retained thereon, for example, by vacuum (each support 5 carries one glass pane 3), into station III (FIG. 2) wherein a rope 2 of a plastic mass (indicated in dashed lines in FIG. 2) is applied to the topside of the glass pane 3 in its marginal zone 42. This rope serves as a spacer means for the insulating glass pane to be manufactured. The composition of the rope 2 serving as the spacer means can be constituted by butyl rubber containing a hygroscopic material.

For this purpose, station III contains a bridge 45 movable on rails 43 in the direction of double arrow 44, a carriage 46 being guided on this bridge. The carriage can be displaced along the bridge 45 in the direction of double arrow 47.

The carriage 46 carries a unit 1 with a nozzle 18, to be pivotable about the axis 12 (arrow 48), as shown in FIG. 3.

In this embodiment, the unit 1 with the nozzle 18 is moved along the rim 42 of the glass pane 3 in the direction of arrow 4. This movement along the rim 42 of the glass pane 3 is achieved by mounting the unit 1 to the carriage 46 which latter is displaceable along the beam 45, the beam 45 proper being movable transversely to its longitudinal extension by means of a drive mechanism. The motion drive mechanism of unit 1 corresponds essentially to the structure of a glass cutting machine, the unit 1 being provided at the carriage 46 in place of the scoring tool. The glass pane 3 can here be aligned substantially horizontally, as illustrated in the embodiment; however, arrangements with an approximately vertically disposed glass pane 3 are likewise possible.

The glass pane 3 is held by the support 5, the supporting surface of the latter being curved at least approximately to the same extent as the glass pane 3; bores 6 are provided in this supporting surface. Via conduits 7, a vacuum can be applied to these bores. Such a retaining arrangement for the glass pane 3 has the advantage over the conventional vacuum-operated retaining means with rubber suction cups that an exact positioning of the glass pane 3 is possible so that the movements of the unit 1 along a movement route extending in parallel to the rim of the glass pane 3 can take place, based on the data stored in the formed glass cutting machine (CNC control). A separate scanning of the rim of the glass pane 3, possible in principle, need not be included in this embodiment for controlling the movement of the unit 1.

The unit 1 comprises a support 10 connected by way of the rod 11 to the carriage 46 and being pivotable about an axis 12 oriented substantially perpendicularly to the glass pane 3. A guide bar 13 is guided within the support 10 and is adjustable by means of a rack-and-pinion drive mechanism 14, 15 in the direction of double arrow 16 relatively to the glass pane 3. By means of this first drive mechanism (coarse drive unit), the mounting 17 carrying the nozzle 18 and a probing finger 19 can be adjusted by moving it closely in front of the surface 23 of the glass pane 3. In case the data regarding the curvature or arcuation of the glass pane 3 are likewise stored, which will usually be the case in series production, for example, of windshield insulating glass panes, these data can also be utilized for moving the nozzle in correspondence with the arcuation/curvature (movement in the direction of axis 12 by means of the drive unit 14, 15).

The nozzle 18 is, in turn, adjustable in the holder 17 in the direction of double arrow 20 with the aid of a rack-and-pinion drive mechanism 21, 22.

The finger probe 19 provided in this embodiment as the device for measuring the distance between the surface 23 of the glass pane 3 and the holder 17 carries at its forward end a roller 24 moving along the surface 23 of the glass pane 3. (The measuring device can also be a measuring unit working in contactless fashion, for example a unit operating with a laser beam, or an optical measuring instrument similar to a range finder as utilized for autofocus photographic cameras. Range finding devices operating with infrared are likewise usable.) The finger probe is movable in the direction of double arrow 25 and is urged against the surface 23 of the glass pane 3, for example, by means of a spring (not shown).

A sensor 26 is associated with the probing finger 19; this sensor is, for example, an electronic measuring ruler and transmits signals corresponding to the distance between the holder 17 and the surface 23 of the glass pane 3. These signals of the sensor 26 are transmitted to the drive mechanism for the pinion 21 so that the nozzle 18 always remains exactly at the predetermined distance, which is adjustable, above the surface 23 of the glass pane 3 even in case of deviations of the position of the rim of glass pane 3 from the desired position—these deviations can reach, in the upward and downward directions, an extent of up to the thickness of the glass pane 3. Thus, under practical conditions, a spacing of the forward end of the nozzle 18 from the surface 23 of the glass pane 3 of, for example, about 0.5 mm can be maintained without there being the danger that the nozzle 18 runs up onto the glass pane 3 and damages the latter, or is damaged itself.

Closely in front of the orifice of nozzle 18, or alternatively in the region of the metering cylinder for the composition to be applied from the nozzle 18 to the glass pane 3, a sensor 30 is provided which detects the quantity (exit rate) leaving the nozzle 18 per unit time of plastic composition 2 (for example butyl rubber or, when applying the sealing rope, polysulfide or another elastically curing composition). The sensor 30 transmits corresponding signals to the motion drive mechanisms of the unit 1 (drive means for the beam 45 and drive means for the carriage 46, as well as drive means for turning the unit 1 about the axis 12) which drive this unit along the rim 42 of the glass pane 3 in the direction of arrow 4. Accordingly, the speed of motion is regulated in response to the exit rate of plastic composition from the nozzle 12, i.e. it is increased when the extrusion rate rises and is reduced in case the latter rate becomes smaller.

By virtue of the exact maintenance of the spacing and preferably by means of the aforedescribed regulation of the motion velocity of the nozzle 18, an exactly dimensioned rope 2, preferably exhibiting a quadrangular cross section, or, in case of a twin nozzle, two parallel ropes 2 and 29 (FIG. 3') is or are applied to the surface 23 of the glass pane 3.

It can be seen from FIG. 7 that the recess 28 imparting to the rope 2 its desired shape exhibits a concave upper boundary 28'; this recess is provided on the side of the nozzle 18 at the rear as based on the direction of motion (arrow 4). Thus, the rope 2 applied to the glass pane 3 has at the top a correspondingly curved surface.

After a spacer 2 has thus been applied to the glass pane 3, the latter is moved into station IV wherein a strip 29 of a caulking compound is applied outside of the spacer 2 in parallel to the spacer 2 and in parallel to the edge 40 of the glass pane 3. The unit 1' utilized for this purpose can be of the same structure as the aforedescribed unit 1 used in station III and illustrated in FIG. 3.

In a modified embodiment, it is likewise possible to use a dual nozzle in place of the single nozzle 18 and to extrude the spacer means 2 and the caulking compound 29 in a single working step; in this case, station III is combined with station IV.

A further possibility of applying the spacer 2 and the rope 29 of caulking compound to the glass pane 3 in one station resides in providing two carriages 46, 46' at the beam 45, one of which carries the unit 1, shown in FIG. 3, for the application of the spacer 2, and the second one of which carries a unit 1' of a structure corresponding to that of unit 1 according to FIG. 3 for the application of the caulking compound 29 onto the surface 23 of the glass pane 3.

It is furthermore worth mentioning that the positioning of the glass pane 3 in station III and in station IV takes place by means of positional stops 50 and 50', respectively, which simultaneously represent the reference points for controlling the movements (arrows 44, 44', 47, 47', 48, 48') of the nozzles 18 or 18' during extrusion of the spacer 2 and the caulking compound 29 onto the glass pane 3.

FIG. 3' furthermore shows the configuration of the rim 42 of the glass pane 3 after leaving station IV or combined station III/IV. It can be seen that a rope 2 of butyl rubber or the like has been applied at a spacing from the edge 40, this rope serving as a spacer means; a rope 29 of caulking compound has been applied outside of this spacer means, i.e. between the rope 2 and the rim 40 of the glass pane 3 in the marginal zone 42 of the latter. The caulking compound constituting the rope 29 is preferably a bicomponent caulking composition curing into an elastic condition, for example a polysulfide. FIG. 3' also shows that both ropes 2 and 29 exhibit a rectangular cross-sectional shape, the rope 2 serving as the spacer being formed of a somewhat greater thickness than the rope 29 of caulking compound.

The thus-prepared glass pane 3 is moved on its support 5 into station V wherein the assembly of the insulating glass pane is accomplished by emplacement of a further glass pane 3.

For this purpose, a robot 51 is provided in the station V which removes glass panes 3, previously washed and dried, for example from a stack, not shown, and places them in the direction of motion arrow 57 with maximum accuracy onto the glass pane 3 present in station V. To this end, the robot 51, fashioned for example in the manner of a crane, is equipped on the free end of its outrigger arm 52 with a head carrying two suction cups 53, the supporting arms of which can be swung about a vertical axis in the direction of double arrow 54.

On account of the inaccuracy encountered when picking up glass panes with the aid of the suction cups 53, the glass pane 3 cannot be exactly placed onto the glass pane 3 present in station V. For this purpose, several alignment slides 56 are provided in station V, mounted to a frame 55; these slides can be of a similar design as the positioning slides 38 in station II. By operating the alignment slides 56, the glass pane 3 placed on the two ropes 2 and 29 is placed into a position exactly congruent with the glass pane 3 retained on the support 5. This can be effected by providing that the alignment slides 56 exhibit a forward, pivotable stop 56' contacting the lower glass pane 3 retained on the support 5, as well as the upper glass pane 3 emplaced by the robot 51. In addition thereto or as an alternative, the movement of the alignment slides 56 can take place as explained above for the positioning slides 38 of station II, by way of the data of the control unit for the glass cutting machine. Especially in this case, it is sufficient for the alignment slides 56 to engage with their forward, optionally pointed end merely at the upper glass pane 3.

The thus-composed, but not yet pressed pane set consisting of two glass panes 3 with interposed spacer means 2 and rope 29 of caulking compound is then transported by the support 5 into station VI for pressing the pane set.

Station VI is again equipped with two movable stops 50 for defining the position of the glass panes 3 in station VI. These stops are of a similar design as the stops 50 in station III and/or IV and can also serve as reference points for the control of the press tool 60.

The press tool 60, shown in greater detail in FIGS. 5 and 6, is mounted on a carriage 61 which latter is displaceable on a beam 63 in the direction of double arrow 62. The beam, in turn, can be moved on rails 64 in the direction of double arrow 65. The press die 60 is pivotable by way of a shaft 68 about an axis oriented essentially perpendicularly with respect to the marginal zone 42 of the glass panes 3 forming the pane pack, as indicated in FIG. 4 by the double arrow 69. Addition-ally, the shaft 68 is guided at the carriage 61 to be movable in the direction of double arrow 70.

The press die 60 comprises two pressure rollers 66 in contact from both sides with the glass panes 3. These rollers are urged toward each other by their mountings 67 so that a corresponding and adequate pressing force is exerted on the panes 3 in order to obtain the reliable marginal bonding of the insulating glass pane to be produced.

The press tool 60 can be constructed, for example, in the way known in principle from Austrian Patent 335,163.

The control of the movement of the press die 60 along the marginal zone 42 of the two glass panes 3 to be pressed can take place in the same way as the control of the movements of nozzles 18, 18' in stations III and-/or IV with evaluation of the data stored in the glass cutting machine by way of the contour of the glass panes 3.

After the two glass panes 3 have been pressed to form a single insulating glass pane, the insulating glass pane is lifted off the support 5 out of the facility (arrow 72) with the aid of a transfer crane 71 which can have a structure similar to that of the robot 51 in station V, and made ready for shipping. The support 5, thus having become vacant, is returned to station I; for this purpose, the rails on which the supports 5 are moved form, for example, an inherently closed track.

In case the supports 5 are equipped with a vacuum unit for fixedly positioning a glass pane 3, they can be provided, as illustrated in FIG. 8, with a vacuum tank 75 which is of tubular shape, for example. The conduits 7 emanate from the vacuum tank 75; these conduits supply the bores 6 with a vacuum. These bores, in the embodiment shown in FIG. 8, are arranged only in the central part 76 of the support 5. The vacuum tank 75 comprises a connection nipple 77 serving as the vacuum inlet, a check valve 78 being arranged in this nipple. This nipple 77 is connected with vacuum connections 79 provided in one or several of the stations II through VI of the facility according to this invention at the time the support 5 is present in the respective station. For this purpose, a portion of the conduit 80 carrying the connections 79 and leading to a vacuum source is fashioned to be liftable (pressure medium cylinder 81). A valve 82 indicated merely symbolically in FIG. 8 is provided in the connection 79; this valve opens once the vacuum connection 79 has been coupled to a vacuum inlet 77.

What is claimed is:

1. In a facility for the production of insulating glass panes from at least two glass panes (3) curved in at least one direction comprising a station (III) for the application of a synthetic resin rope (2) serving as the spacer and a station (IV) for the application of a caulking compound (29) in parallel to a spacer (2) to one of the glass panes, a station (V) for assembly of two glass panes with said caulking compound and spacer between them, a station (VI) for pressing the composed pane set, and a conveying device for the transport of the glass panes (3) through the stations (I through VI) of the facility; the improvement wherein said conveying device has support means (5) for the glass panes (3), said support means has a supporting surface facing a glass pane (3), said supporting surface in an undeformed condition being curved in correspondence with the shape of the glass pane (3) and having bores (6) therethrough connected to a source of vacuum for fixing the glass pane (3) in position on the support means (5).

2. Facility according to claim 1, wherein the support surface (5) is smaller than the glass pane (3) retained by it, so that the glass pane (3) projects beyond the edge of it's support surface.

3. Facility according to claim 1, wherein the station (III) for applying the spacer (2) is preceded by a station (I, II) wherein glass panes (3) coming out of a washing machine (32) are placed on a support (5) of the conveying system and retained thereon in aligned fashion.

4. Facility according to claim 3, wherein the station (II) in which the panes are placed on the support is equipped with at least three positioning slides (38) which align the glass pane (3) with respect to the support (5) before the pane is retained on the support (5).

5. Facility according to claim 4, wherein the positioning slides (36) for aligning the glass pane (3) placed on the support (5) are controlled with evaluation of data for the contour shape of the glass pane (3) stored in a glass cutting device by means of which the glass pane (3) has been produced.

6. Facility according to claim 3, wherein in the first said station (I), the support means (5) can be tilted into a position with a substantially vertical supporting surface, and a glass pane (3) coming from a washing machine (32) is fixedly retained on the support (5) which latter has been tilted into the position with a substantially vertical supporting surface (FIG. 1').

7. Facility according to claim 1, wherein the station (III) for applying the spacer (2) contains at least two stops (50) for the exactly aligned stoppage of the glass panes (3).

8. Facility according to claim 7, wherein a first nozzle (18) for applying the spacer (2) is retained on a carriage (46) which latter is adjustable (arrow 47) along a bridge (45) that is movable transversely (arrow 44) to its longitudinal extension.

9. Facility according to claim 7, wherein the stops (50, 50') cooperate with the support means (5) and with the glass pane (3) retained on the support (5).

10. Facility according to claim 8, wherein a first nozzle (18) is movable toward several degrees of freedom wherein the degrees of freedom are constituted by the displaceability (arrow 44) of the bridge (45), the adjustability (arrow 47) of the carriage (46) along the bridge (45), the rotatability (arrow 48) of the nozzle (18) about an axis (12) perpendicular to the glass surface (23), the adjustability (arrow 16) of the mounting (17) of the nozzle (18) perpendicularly to the axis (12) (coarse adjustment), and the adjustability (arrow 20) of the nozzle (18) with respect to its mounting (17) (fine adjustment).

11. Facility according to claim 10, wherein a measuring unit for measuring the distance between the mounting (17) of said first nozzle (18) and the surface (23) of the glass pane (3) is provided, as seen in the travel direction (arrow 4) in front of the nozzle (18), this measuring unit controlling the drive mechanism (21, 22) for adjusting the nozzle (18) perpendicularly to the surface (23) of the glass pane (3) in such a way that during application of the spacer (2) the distance of the nozzle (18) from the surface (23) to which the spacer (2) is to be applied has a predetermined, constant value.

12. Facility according to claim 11, wherein said first nozzle (18) is designed for the application of a rope (2) of rectangular cross section onto the rim of the glass pane (3).

13. Facility according to claim 11, wherein the probing finger (19) carries, at its end facing the surface (23) of the glass pane (3), a roller (24) in contact with said surface (23) of the glass pane.

14. Facility according to claim 10, wherein two mutually independent drive mechanisms (14, 15) are provided for adjusting the nozzle (18) perpendicularly to the surface (23) of the glass pane (3), a first said drive mechanism comprising a drive unit for adjusting the nozzle (18) to move up to in front of the surface (23) of the glass pane (3), and a second said drive mechanism (21, 22) being connected with a measuring unit.

15. Facility according to claim 14, wherein the measuring unit is carried by the mounting (17) of said first nozzle (18) adjustable by the first drive mechanism (14, 15), and the signals from this unit, corresponding to the distance between the mounting (17) and the surface (23) of the glass pane (3) are transmitted to the second drive mechanism (21, 22) for the adjustment of the nozzle (18).

16. Facility according to claim 1, wherein a second nozzle (18') for extrusion of caulking compound movable in parallel to the spacer (2) and outside of the spacer (2) is arranged in the station (IV) for the application of a caulking compound (29), and the nozzle (18') for the application of the caulking compound (29) is retained on a carriage (46') adjustable along a bridge (45) (arrow 47'), this bridge being movable transversely (arrow 44') to its longitudinal extension.

17. Facility according to claim 16, wherein, as seen in the travel direction (4) in front of the second nozzle (18'), a unit for measuring the distance between the mounting (17') of the second nozzle (18') and the surface (23) of the glass pane (3) is provided, this unit controlling the drive mechanism (21, 22) for adjusting the second nozzle (18') perpendicularly (arrow 20) to the surface (23) of the glass pane (3) in such a way that, during application of the caulking compound (29), the distance of the second nozzle (18') from the surface (23) to which the caulking compound (29) is to be applied has a predetermined, constant value.

18. Facility according to claim 17, wherein the second nozzle (18') is fashioned for the application of a rope (29) substantially rectangular in cross section onto the marginal zone (42) of the glass pane (3).

19. Facility according to claim 18, wherein the probing finger (19) carries a roller (24) at its end in contact with the surface (23) of the glass pane (3).

20. Facility according to claim 19, wherein two mutually independent drive mechanisms (14, 15; 21, 22) are provided for the adjustment of the nozzle (18') perpendicularly (arrow 20) to the surface (23) of the glass pane (3); a first said drive mechanism (14, 15) adjusting the nozzle (18') up to in front of the surface (23) of the glass pane (3); and a second said drive mechanism (21, 22) being operatively connected with the measuring unit.

21. Facility according to claim 20, wherein the measuring unit is carried by the mounting (17) of the second nozzle (18') adjustable by the first drive mechanism (14, 15), and it provides signals corresponding to the distance between the mounting (17) and the surface (23) of the glass pane (3) and, respectively, changes in this distance, that are transmitted to the second drive mechanism (21, 22) for adjusting the second nozzle (18').

22. Facility according to claim 16, wherein the second nozzle (18') for applying the caulking compound (29) to the glass pane (3) is combined with the first nozzle (18) for the extrusion of the spacer (2), to form a twin nozzle.

23. Facility, according to claim 23, wherein at least one of the first nozzle (18) for the extrusion of the spacer (2) and the second nozzle (18') for the extrusion of the rope (29) of caulking compound is designed for the production of ropes having a rectangular cross-sectional shape, wherein the rope (2) constituting the spacer is thicker than the rope (29) of caulking compound.

24. Facility according to claim 16, wherein at least one of the movements of the nozzle (18) for the application of the spacer (2), of the nozzle (18') for the application of the rope (29) of caulking compound and of the press tool (60) are controlled with evaluation of data for the contour shape of a glass pane (3) stored in the glass cutting device by means of which the glass pane (3) has been produced.

25. Facility according to claim 3, wherein a depositing unit (34) is provided in first said station (I), this unit comprising a gripper seizing glass panes (3) coming from a washing machine (32) and depositing them onto a support (5) (FIG. 1).

26. Facility according to claim 25, wherein the gripper is equipped with suction cups.

27. Facility according to claim 25, wherein the gripper is equipped with at least two hook-shaped holding members (35) that can be placed into contact with mutually opposite rims of the glass pane (3).

28. Facility according to claim 16, wherein the second nozzle (18') for the application of the rope (29) of caulking compound is mounted on a carriage (46') adjustable along the beam (45) on which the carriage (46) is guided which latter carries the first nozzle (18) for the application of the spacer (2).

29. Facility according to claim 16, wherein the first nozzle (18) is movable in accordance with several degrees of freedom, wherein the degrees of freedom are constituted by the displaceability (arrow 44) of the bridge (45), the adjustability (arrow 47) of the carriage (46) along the bridge (45), the rotation (arrow 48) of the nozzle (18) about an axis (12) perpendicular to the glass surface (23), the adjustability (arrow 16) of the mounting (17) of the nozzle (18) in an axis (12) oriented perpendicularly to the glass surface (23) (coarse adjustment), and the adjustability (arrow 20) of the nozzle (18) with respect to its mounting (17) (fine adjustment).

30. Facility according to claim 1, wherein the support (5) is equipped with a vacuum tank (75), and at least in several said stations (II to VI), vacuum connections (79) are provided which can be coupled with a vacuum inlet (77) arranged on the vacuum tank (75).

31. Facility according to claim 30, wherein a check valve (78) is associated with the vacuum inlet (77).

32. Facility according to claim 30, wherein the vacuum connection (79) can be coupled to the vacuum inlet (77) by lifting the former.

33. Facility according to claim 30, wherein the vacuum connection (79) comprises a valve (82) which is opened by the vacuum connection (79) being coupled to the vacuum inlet (77) of the vacuum tank (75), but otherwise is closed.

34. Apparatus according to claim 1, wherein a gripper (51, 52, 53) is provided in the station (V) for placing a glass pane (3) onto the glass pane (3) retained on the support (5) and provided with the two synthetic resin ropes (2, 29), this gripper seizing the glass pane (3) to be put in place and depositing it on the ropes (2, 29), and after releasing the gripper (51, 52, 53) from the glass pane (3), alignment slides (56) are arranged which can be advanced from the outside toward the glass pane (3), the placed glass pane (3) being shiftable by means of these slides into a position congruent with the fixedly retained glass pane (3).

35. Facility according to claim 34, wherein the alignment slides (56) are advanceable simultaneously until they contact the glass pane (3) retained on the support (5).

36. Facility according to claim 34, wherein the alignment slides (56) are controlled with evaluation of data for the contour shape of the glass pane (3) stored in a glass cutting device by means of which the glass pane (3) has been produced.

37. Facility according to claim 1, wherein a tool (60) is provided in the station (VI) for pressing the pane set, this tool being movable along the rim (42) of the glass panes (3) of the pane set and being equipped with at least two mutually opposed pressure rollers (66) which latter can be urged toward each other and can be brought into contact with the pane set from both sides.

38. Facility according to claim 37, wherein the tool (60) is mounted on a carriage (61) adjustably guided on a bridge (63) which latter is movable transversely to its longitudinal extension.

39. Facility according to claim 37, wherein the pressure rollers (66) on the carriage (61) are rotatable (arrow 69) about an axis (68) approximately perpendicular with respect to the marginal zone (42) of the glass panes (3).

40. Facility according to claim 1, wherein at least two stops (50') for the exactly aligned stoppage of the glass pane (3) are provided in the station (V) for the application of the rope (29) of caulking compound.

* * * * *